(12) United States Patent
Subramaniam et al.

(10) Patent No.: US 11,418,586 B2
(45) Date of Patent: Aug. 16, 2022

(54) LOAD BALANCING OF DISCOVERY AGENTS ACROSS PROXY SERVERS

(71) Applicant: ServiceNow, Inc., Santa Clara, CA (US)

(72) Inventors: Sreenevas Subramaniam, Santa Clara, CA (US); Tal Kapon, Petah Tikva (IL); Nisan Bar Zion, San Diego, CA (US); Chris Nguyen, San Diego, CA (US); Joshua Gerbasi, San Diego, CA (US); Benjamin Phan, San Diego, CA (US); William Hurt, San Diego, CA (US); Olga Shaked, Petah Tikva (IL); Yuval Rimar, Petah Tikva (IL); Gregory Grisco, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/152,539

(22) Filed: Jan. 19, 2021

(65) Prior Publication Data

US 2022/0232066 A1 Jul. 21, 2022

(51) Int. Cl.
| | | |
|---|---|---|
| *H04L 67/02* | (2022.01) | |
| *H04L 67/101* | (2022.01) | |
| *H04L 67/1027* | (2022.01) | |
| *H04L 43/0852* | (2022.01) | |
| *H04L 43/0811* | (2022.01) | |
| *H04L 67/563* | (2022.01) | |

(52) U.S. Cl.
CPC ........ *H04L 67/101* (2013.01); *H04L 43/0811* (2013.01); *H04L 43/0852* (2013.01);
(Continued)

(58) Field of Classification Search
CPC .............. H04L 67/101; H04L 43/0811; H04L 43/0852; H04L 67/02; H04L 67/1027; H04L 67/2814
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Mike Arpaia, "Introducing osquery—Facebook Code," https://code.fb.com/security/introducing-osquery/, Feb. 15, 2019.

(Continued)

*Primary Examiner* — Viet D Vu
(74) *Attorney, Agent, or Firm* — McDonnell Boehnen Hulbert & Berghoff LLP

(57) ABSTRACT

A non-transitory computer readable storage medium may have stored thereon instructions that, when executed by an endpoint device, cause the endpoint device to perform operations including: (i) establishing, by the endpoint device, a first communication channel with an intermediary proxy server; (ii) receiving, from a computational instance and via the intermediary proxy server, a registration payload comprising a list of available proxy servers; (iii) ranking, at the endpoint device, the list of available proxy servers; (iv) selecting, by the endpoint device, a particular proxy server from the list of available proxy servers as ranked; (v) establishing, by the endpoint device, a second communication channel with the particular proxy server; and (vi) communicating, by the endpoint device, with the computational instance via the particular proxy server by utilizing the second communication channel.

20 Claims, 12 Drawing Sheets

(52) U.S. Cl.
CPC .......... *H04L 67/02* (2013.01); *H04L 67/1027* (2013.01); *H04L 67/563* (2022.05)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,311,216 B1 * | 10/2001 | Smith | G06F 16/9574 |
| | | | 709/225 |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,778,972 B1 | 8/2010 | Cormie et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,600,941 B1 | 12/2013 | Raj | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,098,555 B2 | 8/2015 | Bjork et al. | |
| 9,241,174 B1 * | 1/2016 | Rogers | H04N 21/23103 |
| 9,374,351 B1 | 6/2016 | Basha et al. | |
| 10,079,730 B2 | 9/2018 | Subramanian et al. | |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0084417 A1 * | 4/2006 | Melpignano | H04L 12/5692 |
| | | | 455/418 |
| 2006/0095461 A1 | 5/2006 | Raymond | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0206620 A1 * | 9/2007 | Cortes | H04L 67/61 |
| | | | 370/412 |
| 2007/0288389 A1 | 12/2007 | Vaughan et al. | |
| 2008/0133829 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0094361 A1 * | 4/2009 | Srinivasan | H04L 65/1073 |
| | | | 709/227 |
| 2009/0124284 A1 * | 5/2009 | Scherzer | H04M 1/72457 |
| | | | 455/552.1 |
| 2009/0228984 A1 | 9/2009 | Sterin | |
| 2010/0110932 A1 | 5/2010 | Doran et al. | |
| 2010/0175134 A1 | 7/2010 | Ali-Ahmad et al. | |
| 2011/0231475 A1 * | 9/2011 | Van der Merwe | |
| | | | H04L 67/1002 |
| | | | 709/203 |
| 2012/0016706 A1 | 1/2012 | Pargaonkar et al. | |
| 2015/0358482 A1 * | 12/2015 | Schouwenburg | H04W 12/06 |
| | | | 455/406 |
| 2017/0264480 A1 | 9/2017 | Delegard et al. | |
| 2018/0123940 A1 | 5/2018 | Rimar et al. | |
| 2018/0146049 A1 | 5/2018 | Africa et al. | |
| 2018/0287907 A1 | 10/2018 | Kulshreshtha et al. | |
| 2018/0316746 A1 * | 11/2018 | Shattil | H04L 41/147 |
| 2018/0324030 A1 | 11/2018 | Dang et al. | |
| 2018/0324159 A1 | 11/2018 | Koya et al. | |
| 2019/0050220 A1 | 2/2019 | Daum et al. | |
| 2019/0104398 A1 | 4/2019 | Owen et al. | |
| 2019/0132389 A1 | 5/2019 | Lillie et al. | |
| 2019/0166208 A1 | 5/2019 | Shi et al. | |
| 2019/0205183 A1 | 7/2019 | Provencher et al. | |
| 2019/0268423 A1 | 8/2019 | Shah et al. | |
| 2019/0320385 A1 * | 10/2019 | Bhartia | H04W 48/20 |

(56) References Cited

U.S. PATENT DOCUMENTS

| | | |
|---|---|---|
| 2020/0026787 A1 | 1/2020 | Alam |
| 2020/0120146 A1* | 4/2020 | Christopher ........ H04L 65/1016 |
| 2020/0137148 A1* | 4/2020 | Segal ............... H04N 21/23106 |
| 2021/0064360 A1 | 3/2021 | Moser |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

"Nexthink / Incident Management for ServiceNow," https://www.nexthink.com/platform/integration/servicenow/, Jul. 6, 2020.

"Welcom to osquery—osquery," osquery.readthedocs.io/en/stable, downloaded from Internet on Jul. 6, 2020.

Caleb Hailey, "Sensu, The Missing Link in Hybrid Cloud Operations: the Monitoring Event Pipeline," sensui.io/resources/whitepaper/workflow-automation-for-monitoring, downloaded from Internet on Jul. 6, 2020.

Uptycs, "Live & Historical Incident Investigation", cdn2.hubspot.net/hubfs/2617658/Product%20One%20Pagers/Uptycs%20for%20Incident%20Investigation%20PDF%20(1).pdf, downloaded from Internet on Jul. 6, 2020.

Final Office Action dated Aug. 26, 2021, issued in U.S. Appl. No. 16/934,336, filed Jul. 21, 2020, 24 pages.

Office Action from U.S. Appl. No. 16/934,336, dated Apr. 27, 2021.

Notice of Allowance dated Jan. 18, 2022 for U.S. Appl. No. 16/934,336, 9 pages.

\* cited by examiner

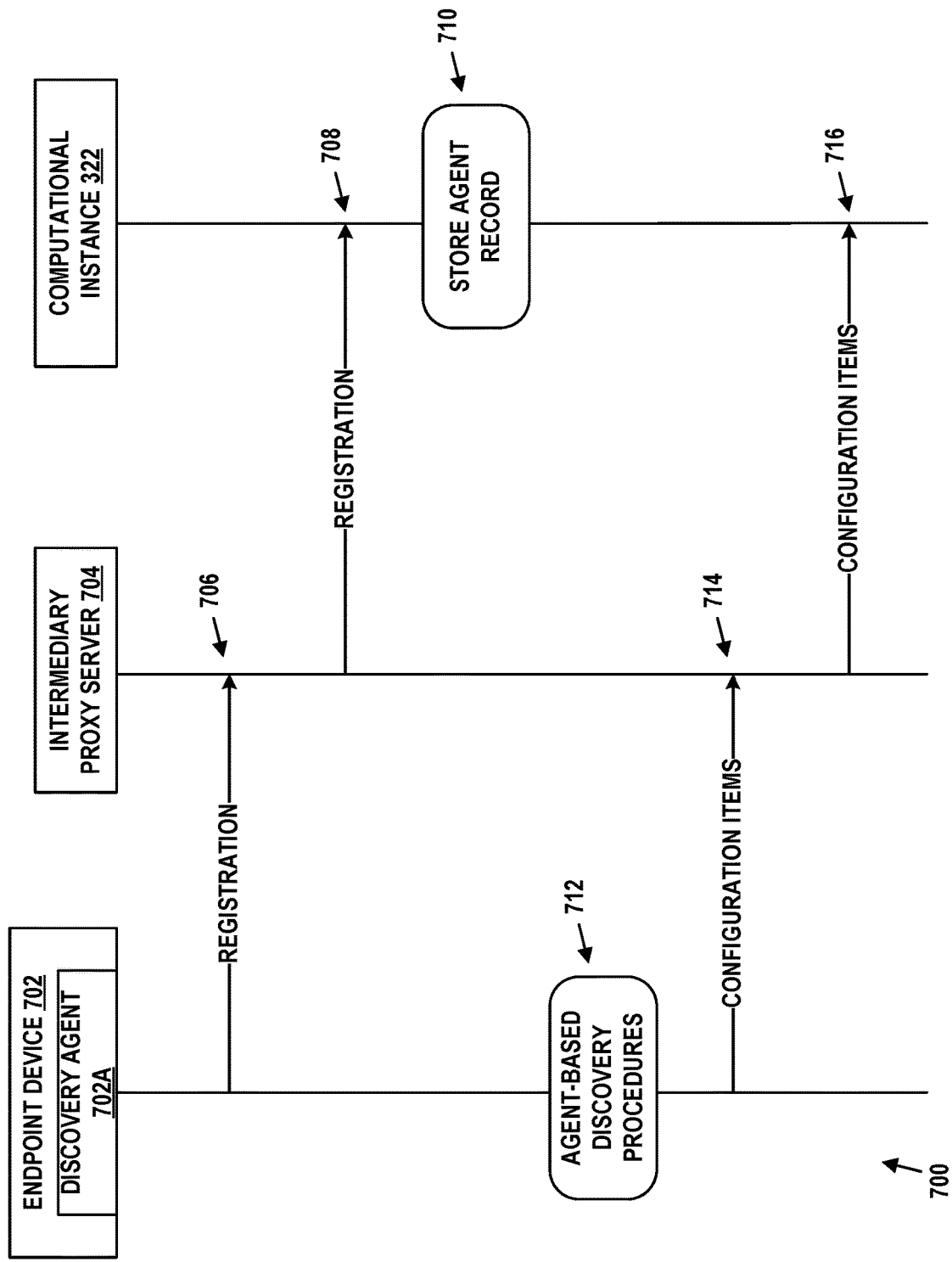

```
{
  "agentToEligibleMids": [
    {
      "agentId": "bd25dc1f513c040e",
      "shouldPerformConnectivityTest": true,
      "mids": [
        {
          "name": "snc_rba_mid",
          "ips": [
            "10.11.128.198",
            "11.11.11.11"
          ],
          "num_connected_agents": 10,
          "domain": "global",
          "port": "8800",
          "secured": false
        }
      ]
    },
    {
      "agentId": "87f6017f2ce00775",
      "shouldPerformConnectivityTest": true,
      "mids": [
        {
          "name": "snc_rba_mid",
          "ips": [
            "10.11.128.198",
            "11.11.11.11"
          ],
          "num_connected_agents": 10,
          "domain": "global",
          "port": "8800",
          "secured": false
        }
      ]
    }
  ]
}
```

LOAD BALANCING OF DISCOVERY AGENTS ACROSS PROXY SERVERS

BACKGROUND

Discovery of devices and software applications on a managed network has become an important aspect of being able to operate such a network. Typically, discovery is an automated process controlled by a remote network management platform and involves scanning devices disposed within the managed network. The results of these scans may characterize the hardware of these devices and the software applications disposed thereon as configuration items. In some cases, relationships between configurations items may also be discernable. Configuration items may be stored in a configuration management database (CMDB) of the remote network management platform.

Traditional discovery is agentless, in that no discovery-assisting software is deployed on devices in order for the devices to be discovered. Agent-based discovery can be used to replace, partially replace, or complement agentless discovery. For example, a discovery agent may be able to detect information that might be more difficult for traditional agentless discovery procedures to identify. Typically, a discovery agent communicates with a computational instance of the network management platform by way of a proxy server, such as a management, instrumentation, and discovery (MID) server. However, due to changes to proxy servers, including frequent and unpredictable activations and deactivations, there may be challenges in the discovery and identification of suitable proxy servers with which the endpoint device can communicate.

SUMMARY

The embodiments herein employ agent-based discovery to facilitate a number of advantageous features of discovery and discovery-related technologies. Endpoint devices associated with a managed network are configured with discovery agents—software operating on the endpoints that facilitate discovery and other operations by executing commands on the endpoint devices and providing the output to a computational instance of a remote network management platform by way of a proxy server.

Typically, when a discovery agent is installed in an endpoint device, it is preconfigured (e.g., in a text file on the endpoint device) with one or more network addresses of proxy servers. This, on its own, is generally not an effective way of specifying proxy servers. Proxy servers may be activated or deactivated in a frequent and unpredictable fashion, and these changes may not be available to the discovery agent. For example, a proxy server may not be available or may be unreachable when the discovery agent attempts to contact it. Also, even when a proxy server is available, it may be carrying a larger load than other available proxy servers.

As described in the embodiments herein, a discovery agent may be configured to receive, by way of a preconfigured, intermediary proxy server, a registration payload that includes a list of available proxy servers. Such a list may include proxy servers that were not preconfigured, and the list can be periodically updated by the computational instance to include proxy servers that have been activated and to remove proxy servers that have been deactivated. The discovery agent, in turn, may use this updated list to maintain nearly uninterrupted connectivity with the computational instance by way of an available proxy server.

Additionally, the agent-based framework described herein can be used to reduce latency between agents and proxy servers as well as to balance load across proxy servers. For example, a discovery agent may perform connectivity tests between the endpoint device and each of the proxy servers in the list. Based on the outcome of these tests, the discovery agent may select a proxy server based on its response time, favoring proxy servers with lower response times over proxy servers with higher response times. Further, the discovery agent may determine a number of currently connected discovery agents for each of the proxy servers, and may select a proxy server that has a lower number of currently connected discovery agents, thereby balancing the load across the proxy servers. Other advantages may also exist.

Accordingly, a first example embodiment may involve a non-transitory computer readable storage medium having stored thereon instructions that, when executed by an endpoint device, cause the endpoint device to perform operations including: (i) establishing, by the endpoint device, a first communication channel with an intermediary proxy server; (ii) receiving, from a computational instance and via the intermediary proxy server, a registration payload comprising a list of available proxy servers; (iii) ranking, at the endpoint device, the list of available proxy servers; (iv) selecting, by the endpoint device, a particular proxy server from the list of available proxy servers as ranked; (v) establishing, by the endpoint device, a second communication channel with the particular proxy server; and (vi) communicating, by the endpoint device, with the computational instance via the particular proxy server by utilizing the second communication channel.

In a second example embodiment, an article of manufacture may include a persistent storage, including a CMDB representing devices and software applications disposed within a managed network and relationships therebetween. The second example embodiment may also involve a proxy server configured to relay discovery information between a plurality of endpoint devices associated with the managed network and the CMDB, wherein respective discovery agents are disposed within each of the endpoint devices, and wherein each endpoint device contains one or more processors configured to execute program instructions that perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, and 7C are message flow diagrams illustrating dynamic discovery and selection of proxy servers, in accordance with example embodiments.

FIG. 8 is an example registration payload, in accordance with example embodiments.

DETAILED DESCRIPTION

Figure 1:
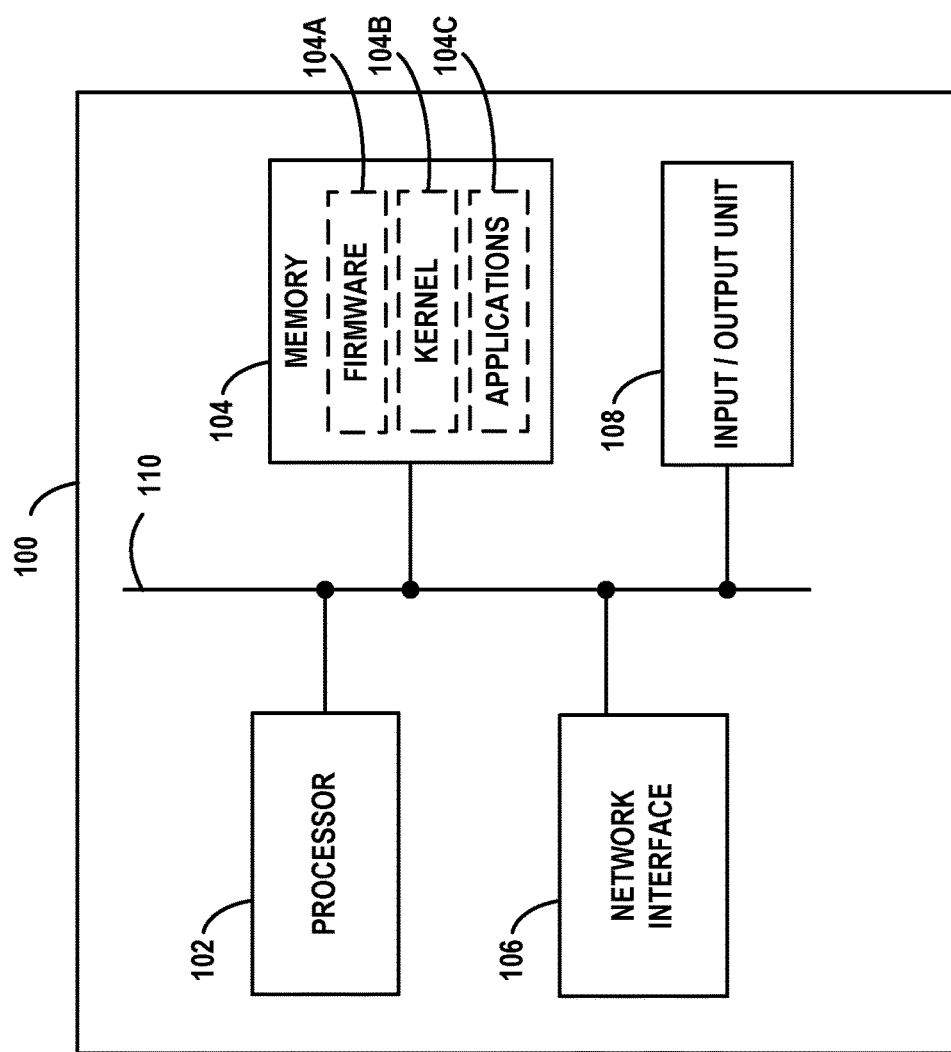
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
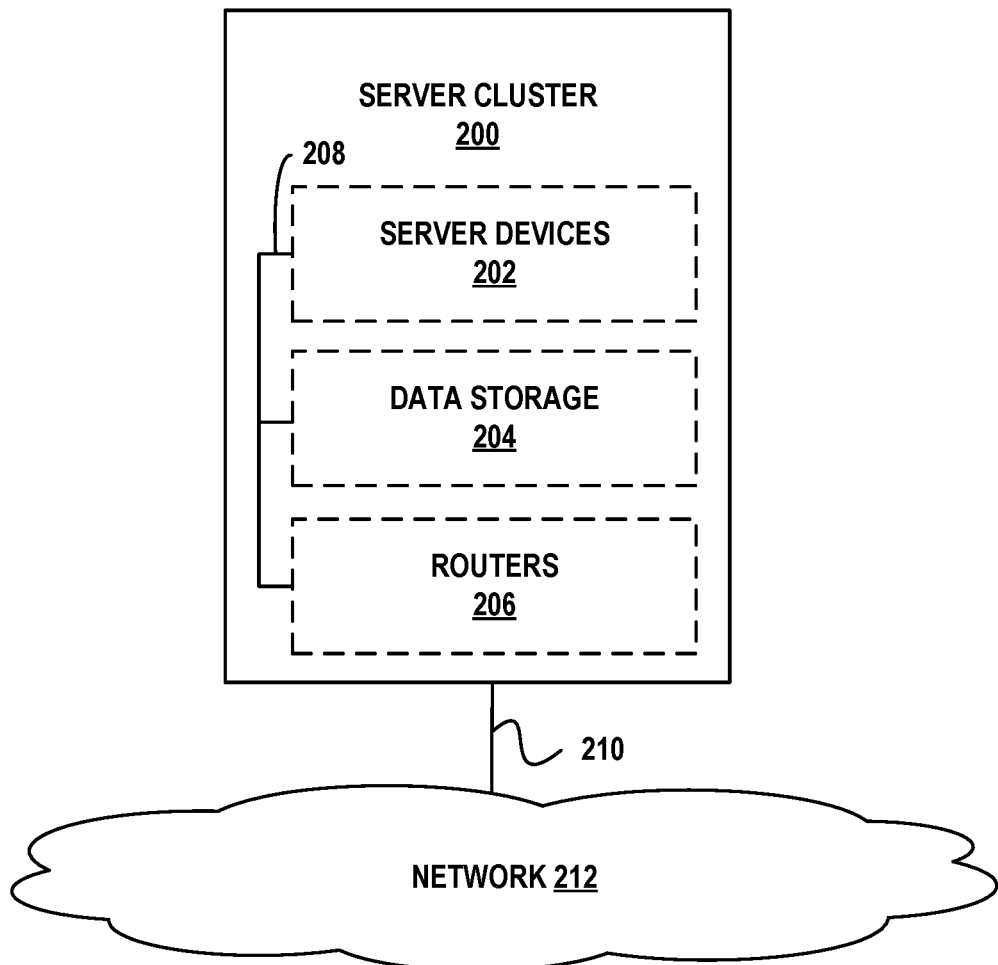
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
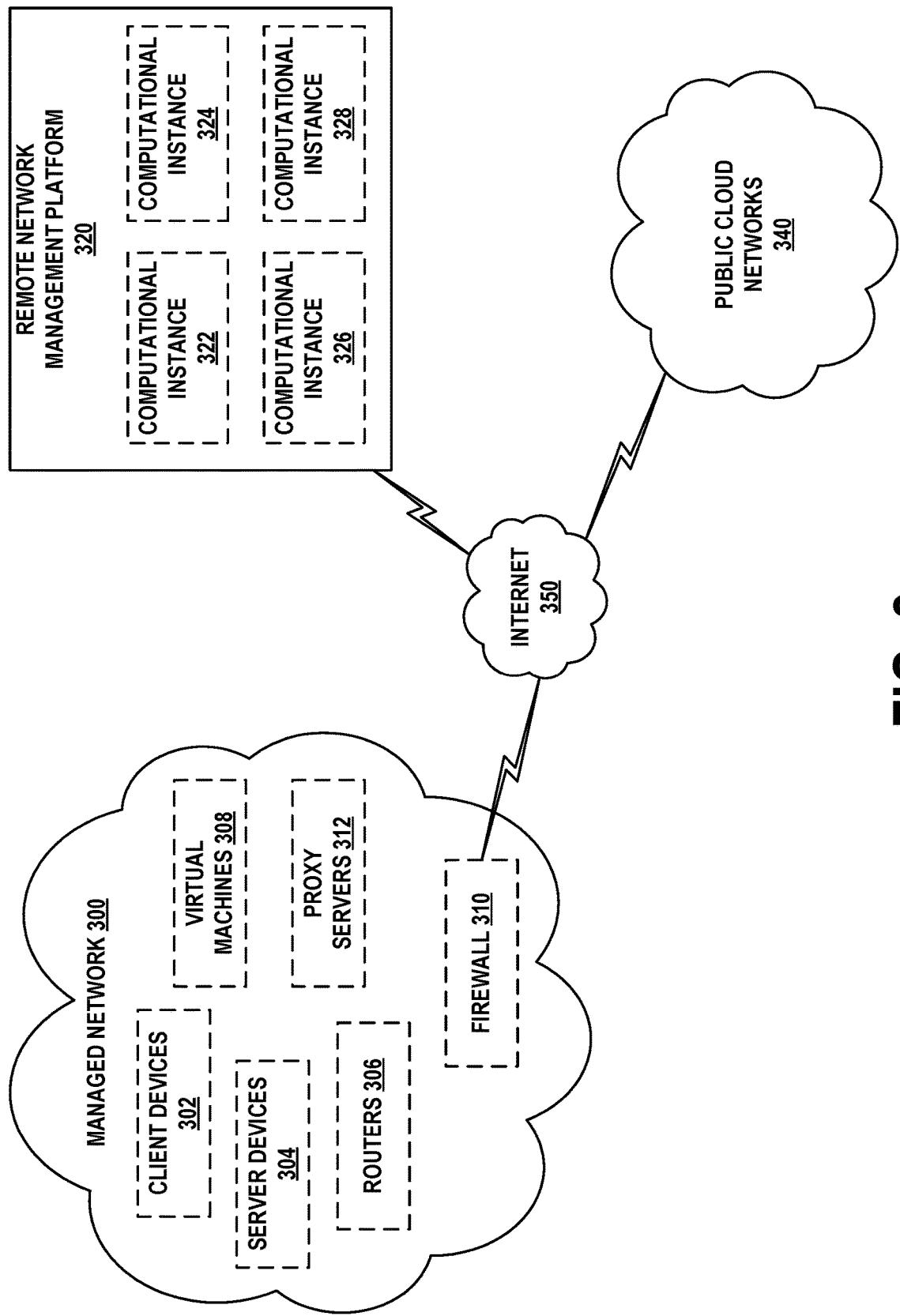
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300. An example proxy server 312 may be a management, instrumentation, and discovery (MID) server.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
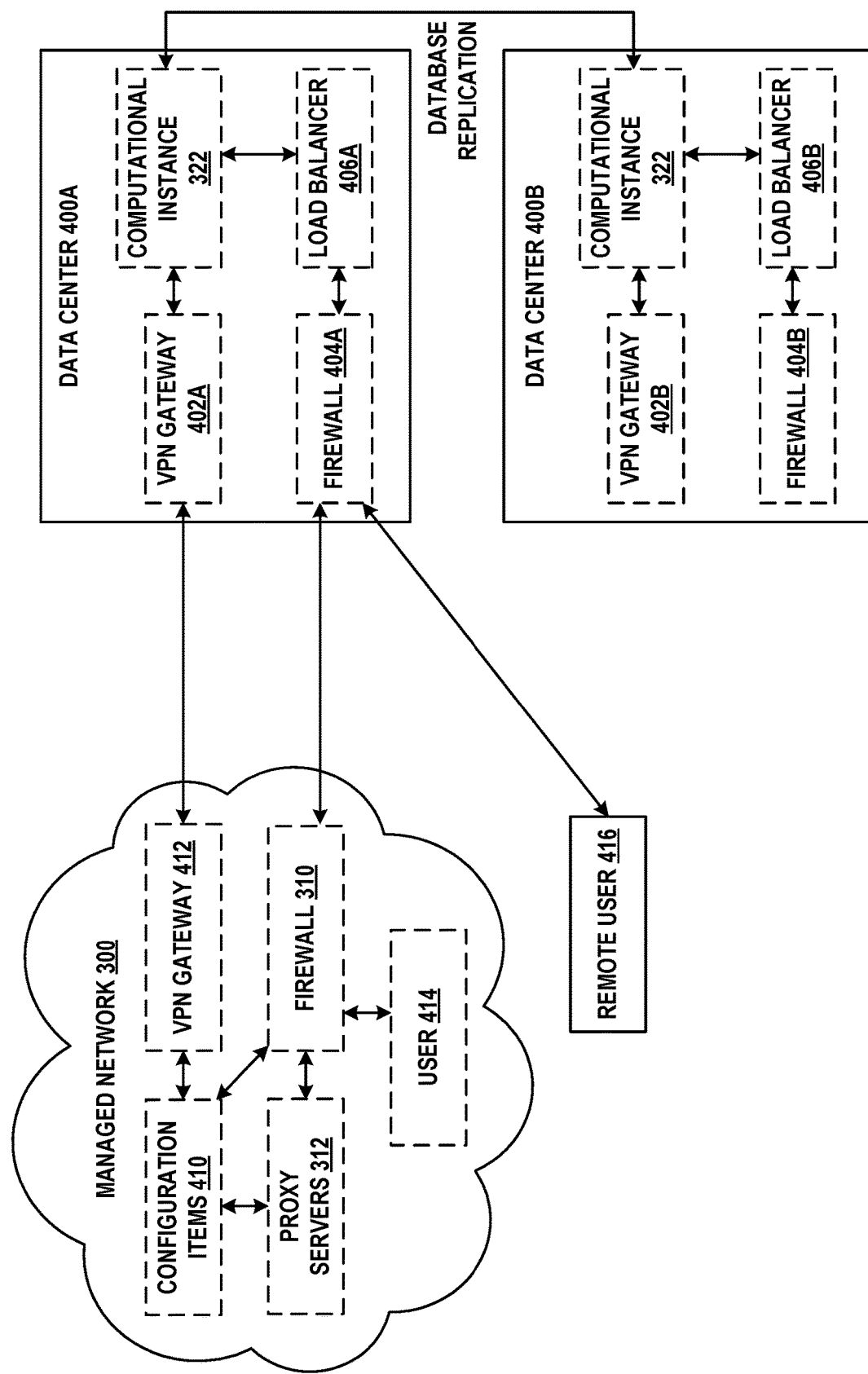
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
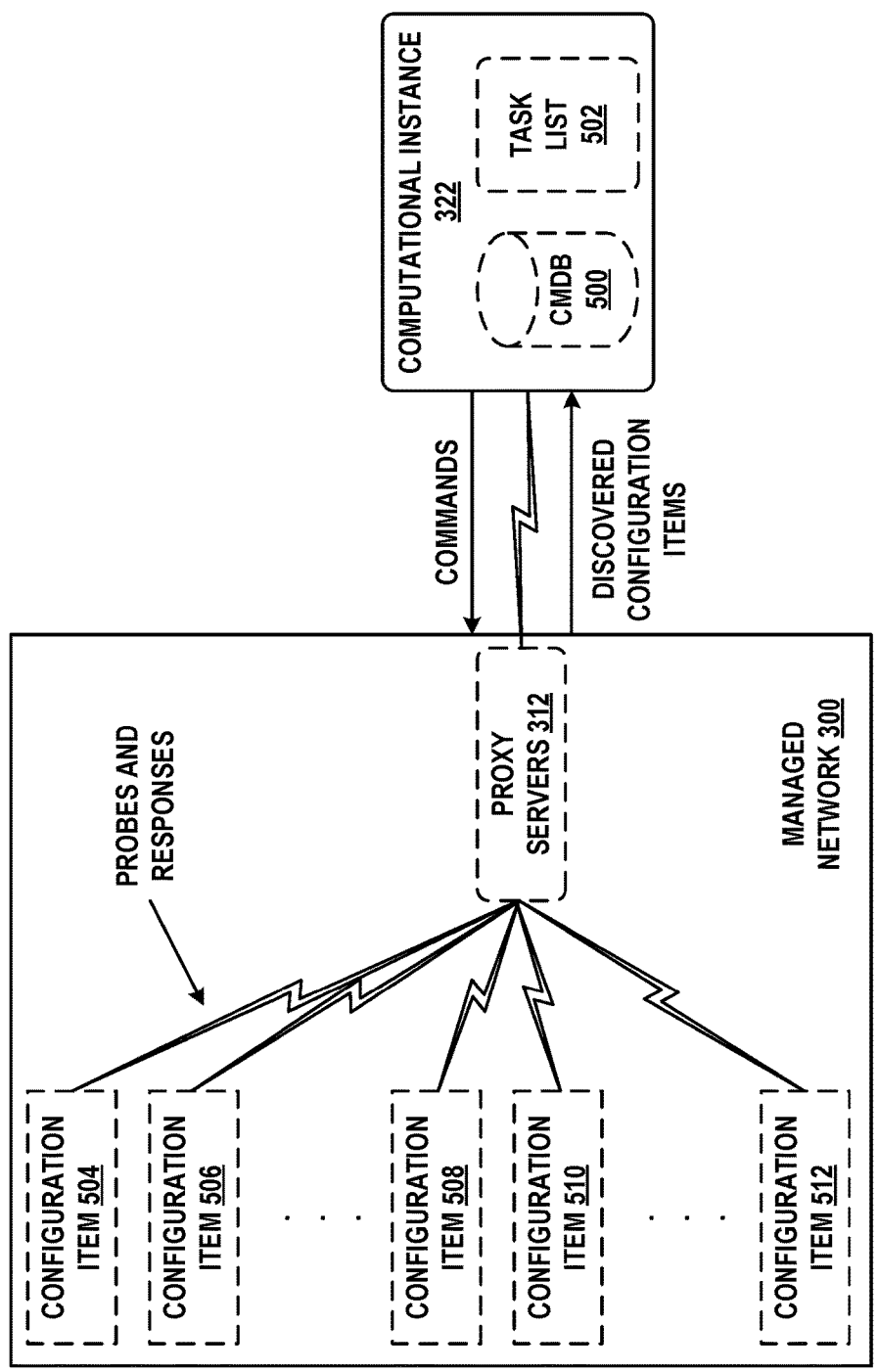
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
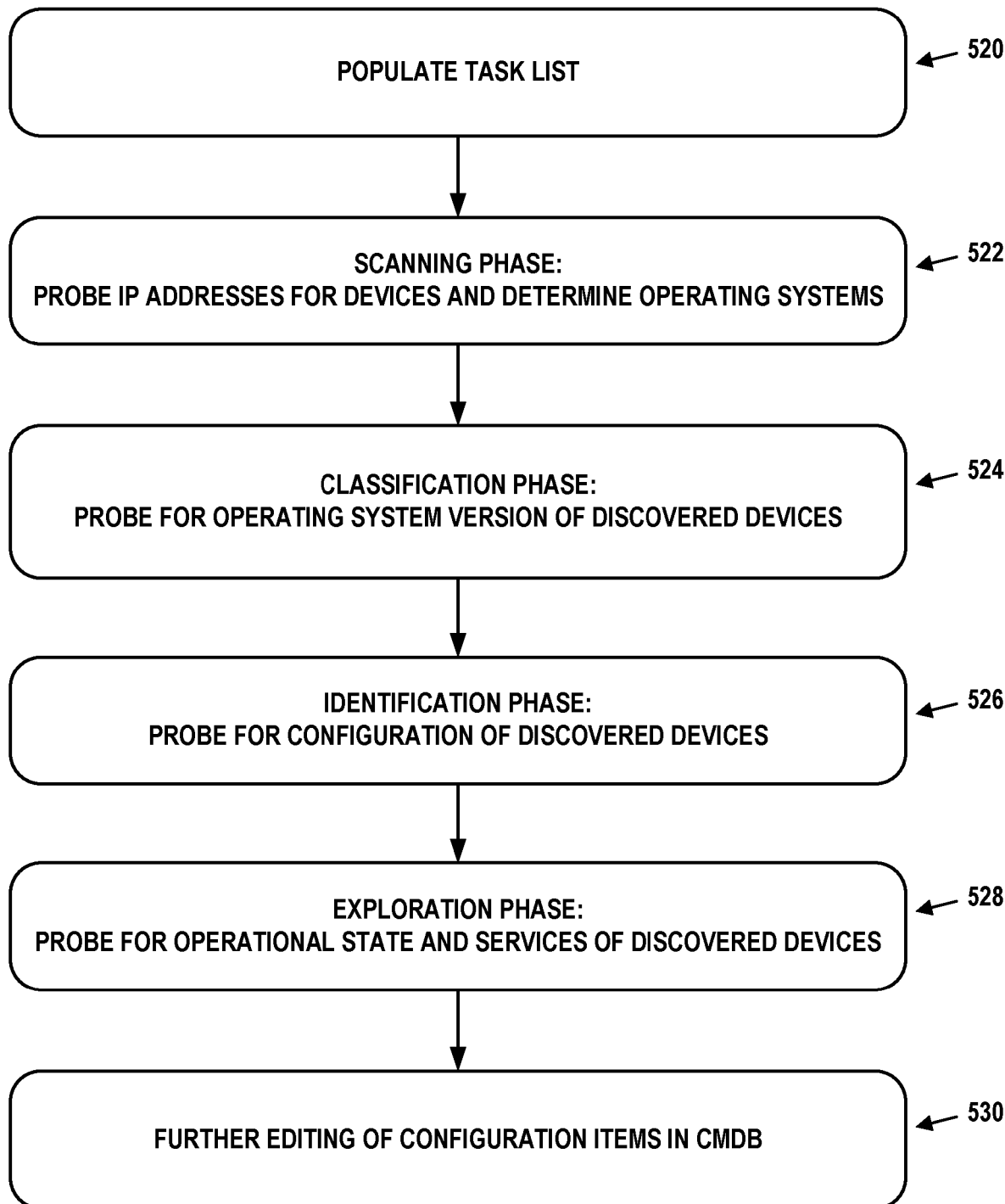
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Selection of Proxy Servers by Discovery Agents

As noted above, traditional discovery is agentless. Thus, a proxy server within a managed network would remotely access or log on to devices disposed within the managed network, and query these devices for configuration and operational information. While agentless discovery is now a key aspect of many forms of IT service management, IT operations management, security operations management, software asset management, and the like, it does have limitations in terms of the information that can be discovered.

Particularly, given the complexity of executing agentless discovery on a large managed network, which could take a number of hours, it might be configured to take place only once per day or once per week. But discovery performed this infrequently might fail to discover certain devices.

The modern workplace may involve numerous users being assigned dedicated mobile devices, such as laptops, tablets, and smartphones. These mobile devices may move from network to network throughout the day, and therefore be in different physical locations and assigned different network addresses (e.g., IP address) on a frequent basis. Thus, agentless discovery may not produce an up-to-date representation of the locations and parameters assigned to these devices.

Further, part of a managed network's workforce may be travelling or otherwise remote, working from the road or from home more than in the managed network's offices. While their devices might be logged into the managed network from time to time (e.g., by way of a VPN), this is not guaranteed to be the case when agentless discovery executes. As a consequence, these devices might not be discovered.

Moreover, a growing amount of server functionality and capacity within a managed network (or operating on behalf of a managed network in a public cloud network) is ephemeral in nature. The hardware of such systems may be virtualized so that it is service-oriented and more efficiently allocated. Some of these virtualized systems may activated (spun up) or deactivated (spun down), on demand so that a virtualized service can respond quickly to variations in demand. Thus, several times per day, or even more frequently, the number and configuration of virtual machines may change. As a result, agentless discovery may be unable to accurately characterize the content of virtualized systems because these systems may alter themselves more frequently than discovery executes.

To overcome these challenges, agent-based discovery can be employed. For example, endpoint devices associated with a managed network may be configured with discovery agents that can facilitate discovery and other operations by executing commands on the endpoint devices and providing the output to a computational instance. Some of these devices may be disposed within the managed network, others may be mobile devices that can access the managed network and/or the remote network management platform remotely, while others are disposed within a public cloud network. The discovery agents may be discrete software packages that are distributed to endpoint devices as part of a standard installation, operating system image or configuration. These discovery agents may be configured to execute as an operating system service or in the background. Examples of discovery agents may include Osquery, Sensu, Chef, and Puppet, among others. Custom agents may be designed based on these existing agents, or may be developed from the ground up.

A discovery agent may be configured to run as an operating system service or in the background. Further, the discovery agent may be in communication with a proxy server—for instance, the discovery agent may be configured to establish a communication session (e.g., a Web Socket or some other form of two-way communication) with a proxy server upon initiation. From time to time, the discovery agent may be triggered to execute and collect information regarding its endpoint device. These triggers may be requests received from the proxy server by way of the communication session, based on expiry of a timer on the endpoint device, or they may take some other form. In the case of timer-based triggers, the acts of collecting information on the endpoint device and reporting it to a proxy server may be decoupled (e.g., the information may be collected and stored, then later reported).

When it is triggered, the discovery agent may execute one or more commands and/or read one or more parameters or settings of the endpoint device. For example, the discovery agent may issue commands by way of a command line interface (CLI), read configuration or operational parameters from a database, registry, and/or file system, and so on. Using these techniques, the discovery agent may gather information related to configuration and/or utilization of processor, memory, and storage resources, lists of installed and/or executing software applications, application error reports, application crash reports, log data, network interface configurations, assigned network addresses, and/or established network connections with other devices, just to name a few possibilities Nonetheless, agent-based discovery also has its challenges. In particular, when a discovery agent is installed on an endpoint device, it may be preconfigured (e.g., in a text file on the endpoint device) with one or more network addresses of proxy servers. These network addresses may take the form of IP addresses, IP addresses paired with TCP or UDP ports, universal resource locators (URLs), domain names, or any other mechanism for identifying the proxy servers. But as noted above, a server functionality and capacity is become more and more ephemeral, even for proxy servers. The functionality of the proxy servers may be virtualized so that they can be activated (spun up) or deactivated (spun down), on demand. Thus, several times per week, per day, or even more frequently, the number and/or configuration of available proxy servers may change.

In some cases, it may be possible to hide these changes behind one or more network addresses. In other words, the network address may also be virtualized so that it is dynamically mapped to an available proxy server. For instance, a domain name or URL may be dynamically updated so that it always (or at least a large part of the time) points to the IP address of an available proxy server. Alternatively, multiple proxy servers (physical or virtual) may be placed behind the same IP address so that they appear to the discovery agents as a single monolithic server.

In this fashion, some proxy servers can be made to be highly-available, allowing proxy server hardware and software to be activated or deactivated while maintaining a proxy server service at the same effective IP address. But these high-availability techniques do not scale to the dozens or hundreds of proxy servers that are deployed in association with large enterprise networks. The proxy servers may be in diverse physical locations, and may be activated or deactivated in accordance with demand or maintenance procedures. Further, in these large deployments, preconfigured network addresses do not easily facilitate selecting proxy servers with fast response times or in a fashion that balances load across the proxy servers. Thus, additional techniques are needed.

In order to overcome these disadvantages, a discovery agent may instead be preconfigured with one or more initial, intermediary proxy servers. These intermediary proxy servers might or might not be configured for high-availability. The discovery agent may select one of these intermediary proxy servers (e.g., using round-robin or random techniques) for initial communication with the computational instance.

During the initial communication, the computational instance may provide, by way of the intermediary proxy server, a registration payload that includes a list of available proxy servers. Such a list can be periodically and/or asynchronously updated by the computational instance to reflect the proxy servers that may have been activated and/or deactivated.

In some implementations, a proxy server can be associated with more than one network address, and the list may include each of these network addresses per proxy server. A given proxy server may determine its network addresses by running a script such as PowerShell for WINDOWS® or Bash for LINUX®, and may report these network addresses to computational instance 322. The script may identify the available network addresses by querying a list or table of physical or virtual interface devices. In the case of cloud-based or virtualized proxy servers, such a script may use an instance metadata service for these purposes. Regardless, determining all IP addresses associated with a proxy server may be important because some of these addresses might be unreachable from some discovery agents. Thus, discovery agents that obtain all network addresses per proxy server (e.g., by way of registration payloads) are more likely to be able to successfully communicate with these proxy servers.

The discovery agent, in turn, may use the list of available proxy servers to maintain nearly uninterrupted connectivity with available and active proxy server. For example, the discovery agent may connect to a first proxy server in the list, and communicate with the computational instance by way of this first proxy server. If the discovery agent detects that the first proxy server is no longer responding to its requests, then the discovery agent may select a second proxy server from the list, and switch to using this second proxy server for communication with the computational instance. In this fashion, the shortcomings of relying solely on preconfigured proxy server network addresses can be mitigated.

Further, discovery agents may perform intelligent selection of proxy servers from the list. For example, discovery agents may conduct connectivity tests between the endpoint device and the proxy servers in the list, and may select a proxy server with a low response time. The selected proxy server may be the one with the minimum response time out of the response times from all proxy servers, or a proxy server with a response time below a predetermined threshold (e.g., 20, 30, or 50 milliseconds). Such selection is likely to result in less latency between the endpoint device and the selected proxy server (and therefore less latency between the endpoint device and computational instance 322 as well).

As another example, proxy servers may support an application programming interface (API) through which respective loads on the proxy servers can be obtained. These loads may take the form of a number of discovery agents currently connected to a proxy server and communicating thereby with the computational instance. Alternatively or additionally, other proxy server load characteristics or a combination thereof may be provided, such as CPU utilization, memory utilization, disk utilization, etc. The API may be, for example, a representational state transfer (REST) or simple object access protocol (SOAP) interface. Regardless of the exact implementation, each proxy server may monitor the current number of discovery agents with which it is connected and publish this information such that it is available to discovery agents by way of an appropriately-formatted request.

Therefore, a discovery agent may periodically or from time to time query such APIs on the proxy servers to determine the respective loads thereon. When selecting a proxy server, a discovery agent may take into account these loads as well as response times. In some embodiments, a discovery agent may place proxy servers into groups based on their response times (e.g., less than 20 milliseconds, between 20 and 40 milliseconds, over 40 milliseconds), and rank the proxy servers within each group based on their respective loads. The discovery agent may select, from the group with the lowest response times, the proxy server with the lowest load. But other possibilities exist.

Notably, a discovery agent may retain the list of available proxy servers in local persistent storage of its endpoint device. Thus, when the discovery agent is re-initialized or the endpoint device is rebooted, the discovery agent does not need to repeat the process of obtaining the list from the computational instance; instead, it can select a proxy server from the list directly.

Once a proxy server is selected, a discovery agent may be in communication with the proxy server. For instance, the discovery agent may be configured to establish a communication session (e.g., a WebSocket or some other form of two-way communication) with the proxy server upon selection of the proxy server or upon agent initiation.

Once a communication channel is established with a proxy server, the discovery agent may use this channel to provide discovery-related information (e.g., in the form of configuration items) regarding its endpoint device to the computational instance. Also by way of this communication channel, the computational instance may provide to the discovery agent, from time to time, an updated list of available proxy servers. For example, the computational instance may prepare a daily or weekly list of available proxy servers, and this list can be sent to the discovery agent via the proxy server currently in communication with the endpoint device. Thus, the discovery agent is able to have access to an updated and current list of active and available proxy servers. In the event that a connection to a proxy server via an existing communication channel is lost, the discovery agent is able to re-establish its communications with the computational instance by selecting a further proxy server from the list and establishing a further communication channel with that proxy server.

Figure 6:
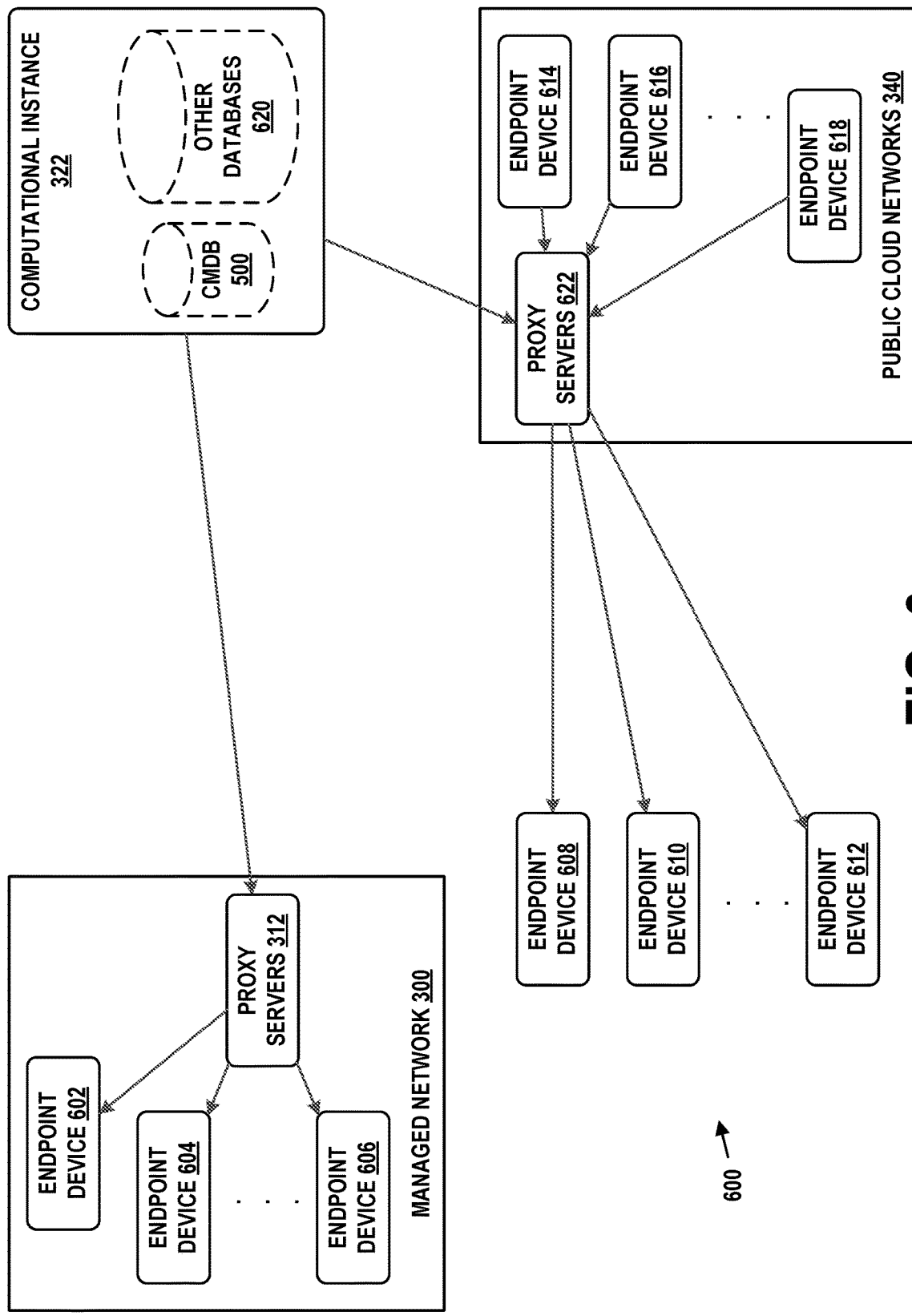
FIG. 6 is an architecture that can support a dynamic discovery and selection of proxy servers, in accordance with example embodiments.

FIG. 6 is an architecture 600 that can support dynamic selection of proxy servers, in accordance with example embodiments. Architecture 600 resembles that of FIG. 3, but provides additional components and details.

Similar to FIG. 3, managed network 300 is communicatively coupled to computational instance 322 by way of over Internet 350, for example. Internet 350 is omitted for sake of simplicity. Public cloud networks 340 are also communicatively coupled to computational instance 322 (e.g., over Internet 350 as well). It is assumed that computational instance 322 is disposed within remote network management platform 320, though remote network management platform 320 is also omitted for sake of simplicity.

Disposed within managed network 300 are endpoint devices 602, 604, and 606. These three endpoint devices represent an array of such endpoint devices that may number in the tens, hundreds, thousands, or more. Discovery agents on endpoint devices 602, 604, and 606 may be configured to communicate with computational instance 322 by way of proxy servers 312. In some embodiments, endpoint devices 602, 604, and 606 are mobile devices, such as laptops, tablets, and/or smartphones. But endpoint devices 602, 604, and 606 could include desktop devices or server devices as well.

Disposed within public cloud networks 340 are endpoint devices 614, 616, and 618. These three endpoint devices also represent an array of such endpoint devices that may number in the tens, hundreds, thousands, or more. Discovery agents on endpoint devices 614, 616, and 618 may be configured to communicate with computational instance 322 by way of proxy servers 622. In some embodiments, endpoint devices 614, 616, and 618 are virtual machines or containerized application frameworks that exist on an ephemeral (e.g., on demand) or semi-permanent basis, but could be any other type of computing device. Proxy servers 622 may also be virtualized, and thus the capacity of these servers (e.g., in terms of processing, memory, and/or communications) may expand or shrink with demand.

Also present in architecture 600 are endpoint devices 608, 610, and 612. These three endpoint devices also represent an array of such endpoint devices that may number in the tens, hundreds, thousands, or more. Discovery agents on endpoint devices 608, 610, and 612 may be devices that are operated and/or under the control of managed network 300, but not located within managed network 300. Thus, these devices may be used by employees or contractors who work from home, travel frequently, or need to be able to access managed network and/or computational instance 322 from various remote locations. Like endpoint devices 614, 616, and 618, endpoint devices 608, 610, and 612 may be configured to communicate with computational instance 322 by way of proxy servers 622.

Computational instance 322 may contain CMDB 500 (described above) and/or other databases 620. The latter may include databases that temporarily store, or store on a long-term basis, configuration and performance related information of one or more of the endpoint devices of FIG. 6. Generally, CMDB 500 is used to store discovery-related information (e.g., configuration items), and other databases 620 are used to store information that is not related to discovery. But there may be some overlap between the information stored in these databases.

VI. Proxy Server Selection for Agent-Based Discovery

Figure 7B:
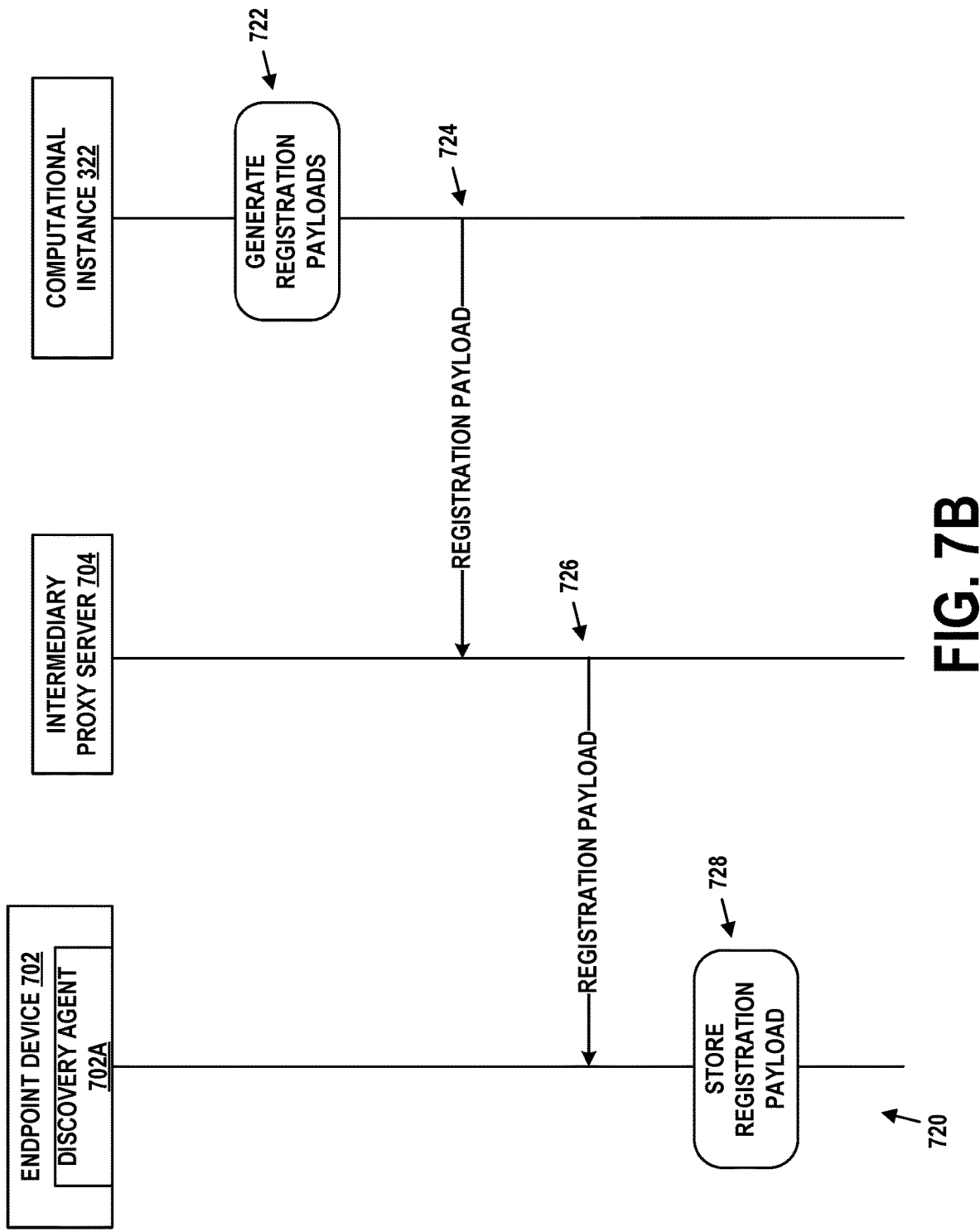
Figure 7C:
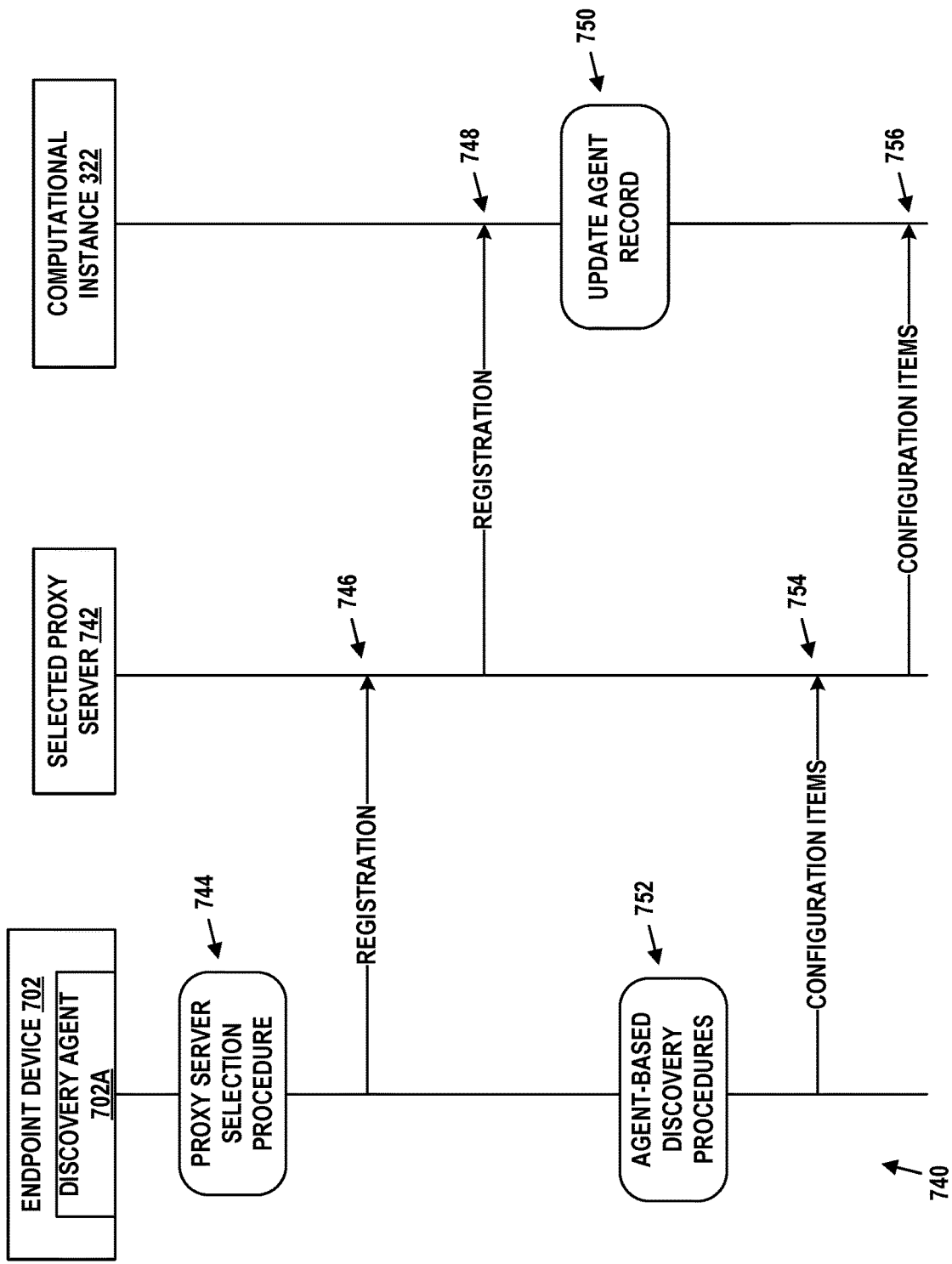

FIGS. 7A, 7B, and 7C are message flow diagrams that depict aspects of proxy server selection. These embodiments generally involve an endpoint device with a discovery agent installed upon it communicating with a computational instance by way of a proxy server. At certain points in these procedures, or from time to time, the discovery agent may select a new proxy server.

Particularly, as shown in message flow diagram 700 of FIG. 7A, endpoint device 702 has installed thereon discovery agent 702A. Endpoint device 702 may be any endpoint device discussed herein, such as any of endpoint devices 602, 604, and 606, endpoint devices 608, 610, and 612, or endpoint devices 614, 616, and 618. Intermediary proxy server 704 may be a proxy server with which discovery agent 702A is preconfigured, and capable of facilitating communication between discovery agents and computational instance 322.

It is assumed that intermediary proxy server 704 is one of potentially many proxy servers that can facilitate such communication. It is further assumed that computational instance 322 is able to keep track of the availability of these proxy servers. For example, computational instance 322 may be configured with a list of proxy servers, and this list may be updated over time. Further, as proxy servers are activated and/or deactivated, computational instance 322 may be made aware of these changes. For example, when a proxy server is activated, it may transmit an indication of this change to computational instance 322. Likewise, when a proxy server is deactivated, it may transmit an indication of this change to computational instance 322 before shutting down. From time to time during normal operation, a proxy server may transmit an indication that it is operating to computational instance 322. In some embodiments, computational instance 322 may assume that a proxy server is deactivated if it has not received any communications from the proxy server for a period of time.

In any event, discovery agent 702A may carry out an initial registration with computational instance 322. This initial registration may take place in response to discovery agent 702A being started, endpoint device 702 being booted, or some other trigger.

Thus, at step 706, discovery agent 702A may transmit a registration message to intermediary proxy server 704 by way of a first communication channel. The network address of intermediary proxy server 704 may be preconfigured within discovery agent 702A along with zero or more network addresses of other intermediary proxy servers. As noted above, discovery agent 702A may choose the network address of intermediary proxy server 704 by using a round robin or random selection process over all of these network addresses.

For example, discovery agent 702A may attempt to connect to each network address until a successful connection with an intermediary proxy server is established, or the network addresses are exhausted. If the network addresses are exhausted without a connection being established, discovery agent 702A may traverse the network addresses attempting to connect again, until a successful connection is established. Each time the network addresses are traversed in this fashion and no connection to an intermediary proxy server is made, discovery agent 702A may wait an increasing length of time before again beginning traversal of the network addresses (e.g., 1 second after the first time, 5 seconds after the second time, 10 seconds after the third time, and so on). Once discovery agent 702A successfully connects to a proxy server, this length of time may be reset. Further, there may be an eventual timeout if discovery agent 702A fails to connect to any proxy server after traversing the network addresses some number of times.

At step 708, intermediary proxy server 704 may forward this registration message to computational instance 322. At step 710, in response to receiving the registration message, computational instance 322 may store an agent record for discovery agent 702A. This agent record may at least identify discovery agent 702A and endpoint device 702, and indicate that discovery agent 702A is registered by way of intermediary proxy server 704. Such agent records allow computational instance 322 to be able to determine the number of discovery agents registered by way of each proxy server, among other advantages.

At step 712, which may take place immediately or at any point after step 706, discovery agent 702A may carry out agent-based discovery procedures. As noted above, these procedures may involve discovery agent 702A executing one or more commands and/or reading one or more parameters or settings of the endpoint device to gather information related to configuration and/or utilization of endpoint device 702. In some embodiments, step 712 may be initiated by computational instance 322, e.g., in response to a message received from computational instance 322.

At step 714, discovery agent 702A may transmit the results of step 712 (and possibly other information as well) to intermediary proxy server 704 in the form of configuration items. At step 716, intermediary proxy server 704 may forward these configuration items to computational instance 322. Although not shown in FIG. 7A, computational instance 322 may store the configuration items in appropriate tables of a CMDB.

Steps 706-716 are shown in the context of a single discovery agent (discovery agent 702A) registering with computational instance 322, carrying out agent-based discovery procedures, and providing configuration items to computational instance 322. In full generality, a large number of discovery agents may be performing the same activities before, after, or during the activities of discovery agent 702A. Thus, computational instance 322 may have stored therein tens, hundreds, or thousands of agent records.

Turning to message flow diagram 720 of FIG. 7B, step 722 involves computational instance 322 generating registration payloads. Each registration payload may be generated separately for a particular discovery agent, for a particular group of discovery agents, or for all discovery agents. For example, if two or more discovery agents register within a window of time with a predetermined length (e.g., 1 minute, 5 minutes, 10 minutes, etc.), the computational instance 322 may send only one copy of the registration payload to the appropriate proxy servers. Then, each proxy server may forward a copy of this registration payload to the newly-registered discovery agents that it serves. The registration payloads may be formatted in accordance with SQL, XML, or JavaScript Object Notation (JSON), as just some examples. The registration payloads may include, for example, an indication of whether the receiving discovery agent should perform a connectivity test to select a new proxy server, and a list of available proxy servers. For each listed proxy server, the following information may be included: one or more IP addresses, the number of connected discovery agents, a domain, a TCP or UDP port number, and/or whether the proxy server supports secured transactions. In various embodiments, more or less information may be provided. A detailed example of registration payloads is shown in FIG. 8 and described below.

In some embodiments, the proxy servers to include in the registration payload may be filtered at computational instance 322 based on various factors. These factors may include: (i) whether a proxy server is active (i.e., inactive proxy servers cannot be used by discovery agents), (ii) whether a proxy server is configured as an agent client collector (ACC) that can receive and process discovery information from discovery agents (not all proxy servers may be configured as such—some may only support agentless discovery), (iii) a domain associated with a proxy server (e.g., some discovery arrangements may support discovery of devices that reside in different end-user networks that are differentiated by named domains), and/or (iv) what type of protocols are supported by a proxy server for communication with discovery agents (e.g., a WebSocket or some other form of two-way communication), and whether such a protocol has been started on the proxy server. Other factors may also be utilized in determining appropriate proxy servers for a given discovery agent.

Step 722 may take place according to a schedule (e.g., based on execution of a scheduled job on computational instance 322), and thus may be performed once per hour, once per day, once per week, or based on some other frequency. In some embodiments, the performance of step 722 may be triggered by the storage of the agent record at step 710.

At step 724, computational instance 322 may transmit the registration payload to intermediary proxy server 704. At step 726, intermediary proxy server 704 transmits the registration payload to discovery agent 702A. At step 728, and possibly in response to receiving the registration payload, discovery agent 702A may store the registration payload. Representations of the proxy servers may be stored in a list or database table, for example. As further registration payloads are received by the discovery agent 702A, the stored registration payloads may be updated accordingly by adding and/or removing entries for proxy servers.

Like steps 706-716, steps 722-728 are shown in the context of a single discovery agent. In full generality, the same or similar activities may take place for a large number of discovery agents.

Turning to message flow diagram 740 of FIG. 7C, step 744 involves discovery agent 702A performing a proxy server selection procedure. Performance of this procedure can be triggered in various ways, such as: (i) by the reception and/or storage of the registration payload at steps 726 and 728, respectively, (ii) based on a predetermined schedule (e.g., once per day, one per two days), and/or (iii) based on discovery agent 702A not having performed the proxy server selection procedure for a threshold period of time (e.g., 24 hours, 48 hours).

Step 744 may involve at least three substeps that are not explicitly depicted in FIG. 7C. The first is discovery agent 702A performing connectivity tests to each of the proxy servers in the registration payload. The second is discovery agent 702A querying each of the proxy servers in the registration payload (or at least the proxy servers that responded appropriately to the connectivity tests) for their respective loads. These loads may be the number of discovery agents connected to each of the proxy servers, and/or the CPU utilization, memory utilization, disk utilization, etc. of the proxy servers. The third is, based on the outcomes of the first and second substeps, selecting a new proxy server for communication with computational instance 322. In some embodiments, step 744 may include more or fewer substeps.

For the first substep, discovery agent 702A may cause endpoint device 702 to "ping" each of the proxy servers in the registration payload by transmitting an Internet Control Message Protocol (ICMP) echo request to those proxy servers in anticipation of receiving an associated ICMP echo reply. By measuring the time between when an echo request is transmitted and the associated echo reply is received, discovery agent 702A may be able to determine (or at least estimate) the round trip latency (i.e., response time) between endpoint device 702 and each proxy server. Alternatively, discovery agent 702A may transmit an authentication request to each of the proxy servers, and the proxy servers may respond (if they respond) with an authentication reply. This allows discovery agent 702A to determine the response time of each proxy server as well as whether discovery agent 702A can successfully register with that proxy server.

In some operating environments, a "ping" may not be feasible. However, other types of messages may be used for purposes of latency determination, such as, for example, discovery agent 702A may transmit a TCP message to a Web Socket port of one or more of the proxy servers. Or, the discovery agent may perform a TCP handshake with each network address corresponding to these proxy servers.

If a proxy server does not respond to a connectivity test (e.g., a "ping" or a TCP handshake), that proxy server may be taken out of consideration for selection. Further, if a registration payload for a particular proxy server contains an indication of that the receiving discovery agent should not perform a connectivity test, then discovery agent 702A may skip the connectivity test for the particular proxy server.

For the second substep, proxy servers may support an API through which respective loads on the proxy servers can be obtained. Such a load may take the form of a number of agents currently connected to a proxy server and communicating thereby with computational instance 322. As noted above, other proxy server load characteristics or a combination thereof may be provided, such as CPU utilization, memory utilization, disk utilization, etc. Also as noted above, the API may be, for example, a REST or SOAP interface. For example, the API for a particular proxy server may be represented as a URL in the form (http://<ip_address>/api/mid/mon/), where the <ip_address>parameter is the IP address of the particular proxy server. Accordingly, discovery agent 702A may query the API of one or more of the available proxy servers 622 for a count of discovery agents communicating by way of each of these proxy servers.

For the third substep, discovery agent 702A may rank the proxy servers for selection. For example, discovery agent 702A may place the proxy servers into groups based on their respective latencies (e.g., less than 20 milliseconds, between 20 and 40 milliseconds, over 40 milliseconds), and rank the proxy servers within each group based on their respective loads. These ranking activities may involve numerically sorting groups based on their associated latency ranges (e.g., lowest to highest) and/or numerically sorting the proxy servers within each group based on their loads (e.g., lowest to highest). Note that it is possible for proxy servers with multiple network addresses to be ranked in this fashion per network address.

Then, discovery agent 702A may select a proxy server by identifying, from the group with the lowest latencies, the proxy server with the lowest load. In this way, a proxy server with both a reasonably low latency and a reasonably low load is selected. Doing so facilitates both low-latency communications between discovery agent 702A and computational instance 322, as well as load balancing across proxy servers.

For sake of illustration, it is assumed that discovery agent 702A ultimately selects selected proxy server 742. Then, at step 746, discovery agent 702A may transmit a registration message to selected proxy server 742 by way of a second communication channel. At step 748, selected proxy server 742 may forward this registration message to computational instance 322. At step 750, in response to receiving the registration message, computational instance 322 may update the agent record for discovery agent 702A. This agent record may be updated to indicate that discovery agent 702A is now connected by way of selected proxy server 742.

At step 752, which may take place immediately or at any point after step 750, discovery agent 702A may carry out agent-based discovery procedures. As noted above, these procedures may involve discovery agent 702A executing one or more commands and/or reading one or more parameters or settings of the endpoint device to gather information related to configuration and/or utilization of endpoint device 702.

At step 754, discovery agent 702A may transmit the results of step 752 (and possibly other information as well) to selected proxy server 742 in the form of configuration items. At step 756, selected proxy server 742 may forward these configuration items to computational instance 322. Although not shown in FIG. 7C, computational instance 322 may store the configuration items in appropriate tables of a CMDB.

Like steps 706-716 and 722-728, steps 744-756 are shown in the context of a single discovery agent (discovery agent 702A). In full generality, a large number of discovery agents may be performing the same activities before, after, or during the activities of discovery agent 702A.

Furthermore, discovery agent 702A may re-perform step 744 periodically, from time to time, or in response to a failure to communicate properly with selected proxy server 742. Doing so may result in yet another proxy server being selected, and discovery agent 702A may switch to registering with this newly-selected proxy server.

FIG. 8 is an example registration payload 800, formatted in accordance with JSON. Registration payload 800 includes proxy servers for more than one agent, and thus computational instance 322 may provide parts of registration payload 800 to various agents.

For example, the first object in registration payload 800 is for a discovery agent with agentID bd25dc1f513c040e. The object indicates that the receiving agent should perform a connectivity test to the listed proxy servers, as the "shouldPerformConnectivityTest" element is true. The object also includes a list of proxy servers ("mids"). This particular list only specifies one such proxy server with a name of "snc_rba_mid", which is configured with IP addresses 10.11.128.198 and 11.11.11.11. The object further specifies that the number of connected agents is 10, as the "num_connected_agents" element has a value of 10. The object also specifies that the domain of this proxy server is "global", that its TCP or UDP port number (e.g., for a handshake) is 8800, and that communication via this port is not to be secured, e.g., via secure hypertext transfer protocol (HTTPS) or secure Web Socket (WSS). The second object contains the same information for a discovery agent with agentID 87f6017f2ce00775.

VII. Example Operations

Figure 9:
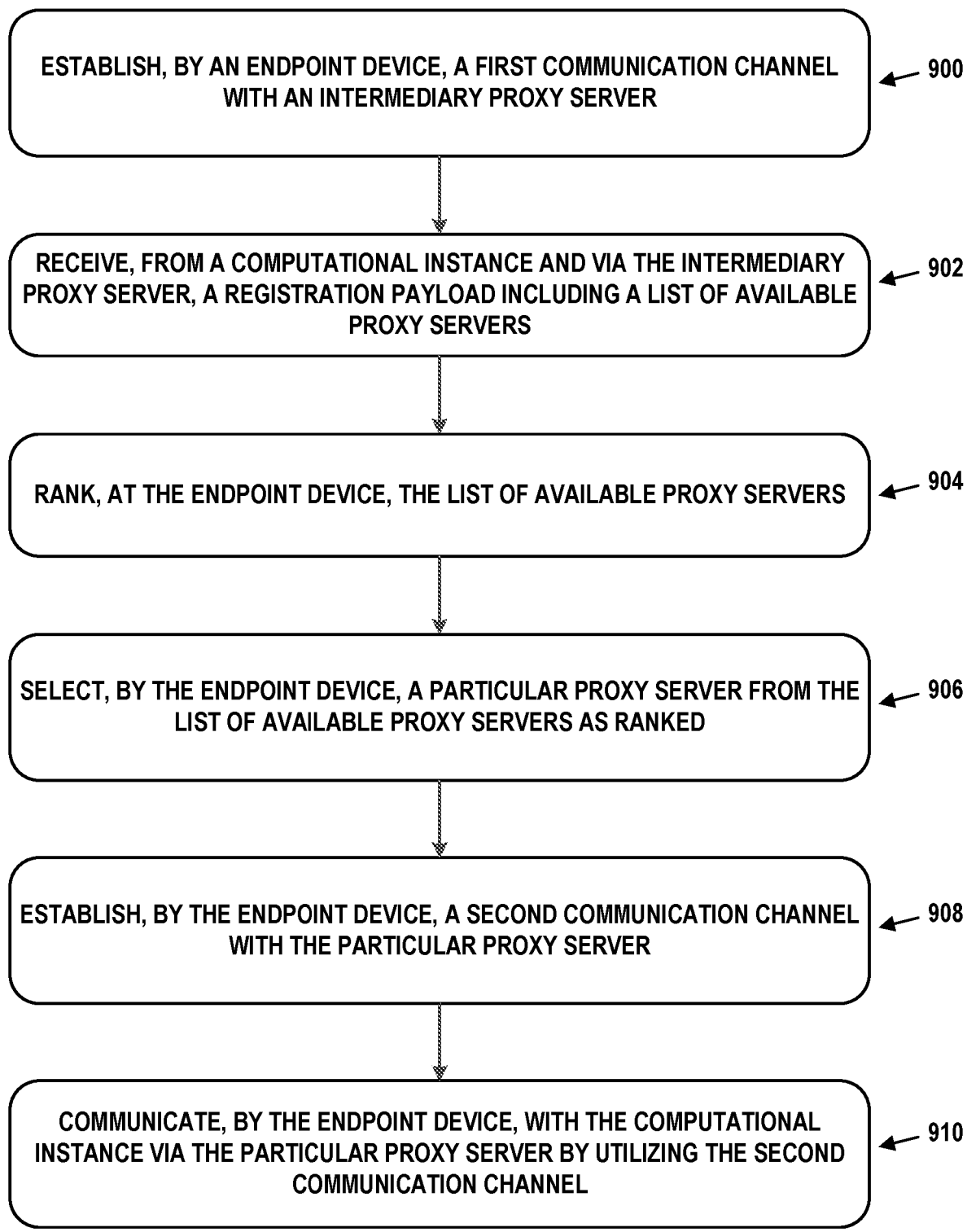
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process may be carried out by other types of devices or device subsystems. For example, the process could be carried out by a discovery agent disposed within an endpoint device. The endpoint device may be associated with a managed network to which a computational instance of a remote network management platform is dedicated.

The embodiments of FIG. 9 may be simplified by the removal of any one or more of the features shown therein. Further, these embodiments may be combined with features, aspects, and/or implementations of any of the previous figures or otherwise described herein.

Block 900 of FIG. 9 may involve establishing, by an endpoint device, a first communication channel with an intermediary proxy server.

Block 902 may involve receiving, from a computational instance and via the intermediary proxy server, a registration payload including a list of available proxy servers.

Block 904 may involve ranking, at the endpoint device, the list of available proxy servers.

Block 906 may involve selecting, by the endpoint device, a particular proxy server from the list of available proxy servers as ranked.

Block 908 may involve establishing, by the endpoint device, a second communication channel with the particular proxy server.

Block 910 may involve communicating, by the endpoint device, with the computational instance via the particular proxy server by utilizing the second communication channel.

In some embodiments, the endpoint device may be associated with a managed network to which the computational instance is dedicated, and may include a discovery agent disposed within the endpoint device.

Some embodiments may involve performing a connectivity test between the endpoint device and the available proxy servers. The ranking may be based on results of the connectivity test.

In some embodiments, the ranking of the list of available proxy servers may further involve: (i) measuring respective latencies between the endpoint device and each of the available proxy servers; (ii) querying each of the available proxy servers for a count of endpoint devices communicating therewith; (iii) placing the available proxy servers into groups based on the respective latencies; and (iv) determining a further ranking of the available proxy servers within each of the groups based on the count of endpoint devices communicating with each available proxy server. In such embodiments, selecting the particular proxy server may further involve choosing, from a group in which the respective latencies are lowest, a proxy server that has a count of endpoint devices that is lowest.

In some embodiments, the registration payload may be in JSON format, the second communication channel may be configured with a Web Socket protocol, and a communication channel between the particular proxy server and the computational instance may be configured with HTTPS or WSS.

In some embodiments, the registration payload may include, for each available proxy server, a list of network addresses associated with the available proxy server. In some embodiments, the particular proxy server may be associated with two or more network addresses for which latencies with the endpoint device have been measured. In some embodiments, establishing the second communication channel may further involve selecting a network address from the two or more network addresses that is associated with a minimum of the latencies.

In some embodiments, selecting the particular proxy server may further involve: (i) selecting an initial proxy server from the list of available proxy servers; attempting to establish a communication channel with the initial proxy server; (iii) determining that the communication channel has not been established; and (iv) in response to determining that the communication channel has not been established, selecting the particular proxy server. In some embodiments, determining that the communication channel has not been established may further involve failing to establish the communication channel with each of one or more network addresses associated with the initial proxy server.

Some embodiments may further involve: (i) detecting that the second communication channel with the particular proxy server is not available; and (ii) establishing a third communication channel with the intermediary proxy server to receive, from the computational instance and via the intermediary proxy server, an updated registration payload comprising an updated list of available proxy servers.

In some embodiments, establishing the third communication channel may be caused by determining that more than a threshold amount of time has passed since a last connectivity test was performed between the endpoint device and the particular proxy server. In an example, if the endpoint device has tried to connect to all known proxy servers (e.g., the proxy servers that were determined by the last connectivity test) then endpoint device may perform a new connectivity test with the cached proxy server list (the endpoint device may receive a new list every 24 hours). There might be new proxy servers in the cache that are not in the configured list. If it fails again, endpoint device may start to wait between connectivity tests—first 1 minute, then 5 minutes, and then 10 minutes, etc. until success.

Some embodiments may further involve: (i) detecting that the second communication channel with the particular proxy server is not available; and (ii) establishing a third communication channel with another available proxy server from the list of available proxy servers as ranked.

Some embodiments may further involve storing the registration payload in a local cache disposed within the endpoint device.

Some embodiments may further involve receiving, based on one or more pre-determined schedules and via the particular proxy server, an updated registration payload from the computational instance comprising an updated list of available proxy servers.

In some embodiments, the particular proxy server may be disposed outside of a managed network with which the computational instance is associated.

In some embodiments, the endpoint device may be disposed outside of a managed network with which the computational instance is associated.

In some embodiments, the endpoint device may be a virtual or ephemeral unit of software, existence of which may be initiated and terminated by a controller device.

In some embodiments, establishing the second communication channel may further involve: (i) sending a register message identifying that the endpoint device seeks to establish a registration with the particular proxy server and that the endpoint device is configured to carry out agent-based discovery; and (ii) receiving, from the particular proxy server, an acceptance of the registration.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A non-transitory computer readable storage medium having stored thereon instructions that, when executed by an endpoint device, cause the endpoint device to perform operations comprising:

establishing, by the endpoint device, a first application-layer communication channel with an intermediary proxy server, wherein the intermediary proxy server is in communication with a computational instance, wherein the intermediary proxy server and the endpoint device are both deployed on a common managed network, and wherein the computational instance is deployed remotely from the common managed network;

receiving, from the computational instance and by way of the intermediary proxy server through the first application-layer communication channel, a registration payload comprising a list of available proxy servers maintained by the computational instance;

ranking, at the endpoint device, the list of available proxy servers;

selecting, by the endpoint device, a particular proxy server from the list of available proxy servers as ranked, wherein the particular proxy server is in communication with the computational instance;

establishing, by the endpoint device, a second application-layer communication channel with the particular proxy server; and communicating, by the endpoint device, with the computational instance through the particular proxy server by utilizing the second application-layer communication channel, wherein the particular proxy server is configured to relay discovery information between the endpoint device and the computational instance.

2. The non-transitory computer readable storage medium of claim 1, wherein the endpoint device is associated with a managed network to which the computational instance is dedicated, and comprises a discovery agent disposed within the endpoint device.

3. The non-transitory computer readable storage medium of claim 1, wherein the instructions cause the endpoint device to perform operations comprising:

performing a connectivity test between the endpoint device and the available proxy servers, and wherein the ranking is based on results of the connectivity test.

4. The non-transitory computer readable storage medium of claim 1, wherein ranking the list of available proxy servers comprises: (i) measuring respective latencies between the endpoint device and each of the available proxy servers; (ii) querying each of the available proxy servers for a count of endpoint devices communicating therewith; (iii) placing the available proxy servers into groups based on the respective latencies; and (iv) determining a further ranking of the available proxy servers within each of the groups based on the count of endpoint devices communicating with each available proxy server; and wherein selecting the particular proxy server comprises choosing, from a group in which the respective latencies are lowest, a proxy server that has a count of endpoint devices that is lowest.

5. The non-transitory computer readable storage medium of claim 1, wherein the registration payload is in JavaScript Object Notation (JSON) format, wherein the second application-layer communication channel is configured with a WebSocket protocol, and wherein a further application-layer communication channel between the particular proxy server and the computational instance is configured with a secure hypertext transfer protocol (HTTPS) or secure WebSocket protocol (WSS).

6. The non-transitory computer readable storage medium of claim 1, wherein the registration payload further comprises, for each available proxy server, a list of network addresses associated with the available proxy server.

7. The non-transitory computer readable storage medium of claim 6, wherein the particular proxy server is associated with two or more network addresses for which latencies with the endpoint device have been measured, and wherein establishing the second application-layer communication channel comprises:

selecting a network address from the two or more network addresses that is associated with a minimum of the latencies.

8. The non-transitory computer readable storage medium of claim 1, wherein selecting the particular proxy server comprises:

selecting an initial proxy server from the list of available proxy servers;

attempting to establish an application-layer communication channel with the initial proxy server;

determining that the application-layer communication channel has not been established; and in response to determining that the application-layer communication channel has not been established, selecting the particular proxy server.

9. The non-transitory computer readable storage medium of claim 8, wherein determining that the application-layer communication channel has not been established comprises failing to establish the application-layer communication channel with each of one or more network addresses associated with the initial proxy server.

10. The non-transitory computer readable storage medium of claim 1, wherein the instructions cause the endpoint device to perform operations comprising:

detecting that the second application-layer communication channel with the particular proxy server is not available; and establishing a third application-layer communication channel with the intermediary proxy server to receive, from the computational instance and through the intermediary proxy server, an updated registration payload comprising an updated list of available proxy servers.

11. The non-transitory computer readable storage medium of claim 10, wherein establishing the third application-layer communication channel is caused by determining that more than a threshold amount of time has passed since a last connectivity test was performed between the endpoint device and the particular proxy server.

12. The non-transitory computer readable storage medium of claim 1, wherein the instructions cause the endpoint device to perform operations comprising:

detecting that the second application-layer communication channel with the particular proxy server is not available; and establishing a third application-layer communication channel with another available proxy server from the list of available proxy servers as ranked.

13. The non-transitory computer readable storage medium of claim 1, wherein the instructions cause the endpoint device to perform operations comprising:

storing the registration payload in a local cache disposed within the endpoint device.

14. The non-transitory computer readable storage medium of claim 1, wherein the instructions cause the endpoint device to perform operations comprising:
receiving, based on one or more pre-determined schedules and through the particular proxy server, an updated registration payload from the computational instance comprising an updated list of available proxy servers.

15. The non-transitory computer readable storage medium of claim 1, wherein the particular proxy server is disposed outside of a managed network with which the computational instance is associated.

16. The non-transitory computer readable storage medium of claim 1, wherein the endpoint device is disposed outside of a managed network with which the computational instance is associated.

17. The non-transitory computer readable storage medium of claim 1, wherein the endpoint device is a virtual or ephemeral unit of software, existence of which is initiated and terminated by a controller device.

18. The non-transitory computer readable storage medium of claim 1, wherein the establishing the second application-layer communication channel comprises:
sending a register message identifying that the endpoint device seeks to establish a registration with the particular proxy server and that the endpoint device is configured to carry out agent-based discovery; and
receiving, from the particular proxy server, an acceptance of the registration.

19. A computer-implemented method comprising:
establishing, by an endpoint device associated with a managed network, a first application-layer communication channel with an intermediary proxy server, wherein the intermediary proxy server is in communication with a computational instance, wherein the intermediary proxy server and the endpoint device are both deployed on a common managed network, and wherein the computational instance is deployed remotely from the common managed network;
receiving, from the computational instance and by way of the intermediary proxy server through the first application-layer communication channel, a registration payload comprising a list of available proxy servers maintained by the computational instance;
ranking, at the endpoint device, the list of available proxy servers;
selecting, by the endpoint device, a particular proxy server from the list of available proxy servers as ranked, wherein the particular proxy server is in communication with the computational instance;
establishing, by the endpoint device, a second application-layer communication channel with the particular proxy server; and
communicating, by the endpoint device, with the computational instance through the particular proxy server by utilizing the second application-layer communication channel, wherein the particular proxy server is configured to relay discovery information between the endpoint device and the computational instance.

20. An endpoint device associated with a managed network, comprising:
one or more processors;
one or more network interfaces; and
memory, having stored thereon program instructions that, upon execution by the one or more processors, cause the one or more processors to perform operations comprising:
establishing, by the one or more network interfaces, a first application-layer communication channel with an intermediary proxy server, wherein the intermediary proxy server is in communication with a computational instance, wherein the intermediary proxy server and the endpoint device are both deployed on a common managed network, and wherein the computational instance is deployed remotely from the common managed network;
receiving, from the computational instance and by way of the intermediary proxy server through the first application-layer communication channel, a registration payload comprising a list of available proxy servers maintained by the computational instance;
ranking the list of available proxy servers;
selecting a particular proxy server from the list of available proxy servers as ranked, wherein the particular proxy server is in communication with the computational instance;
establishing, by the one or more network interfaces, a second application-layer communication channel with the particular proxy server; and
communicating with the computational instance through the particular proxy server by utilizing the second application-layer communication channel, wherein the particular proxy server is configured to relay discovery information between the endpoint device and the computational instance.

* * * * *